July 26, 1966 — S. D. HART — 3,262,307
OMNIDIRECTIONAL ULTRASONIC SEARCH SYSTEM
Filed Oct. 28, 1963

INVENTOR
STEPHEN D. HART

BY Richard C. Reed
ATTORNEY

United States Patent Office 3,262,307
Patented July 26, 1966

3,262,307
OMNIDIRECTIONAL ULTRASONIC SEARCH
SYSTEM
Stephen D. Hart, Arlington, Va., assignor to the United
States of America as represented by the Secretary of
the Navy
Filed Oct. 28, 1963, Ser. No. 319,616
2 Claims. (Cl. 73—71.5)

The invention described herein may be manufactured and used by or for the Government of the United States of America for governmental purposes without the payment of any royalties thereon or therefor.

The present invention relates to an omnidirectional ultrasonic search mechanism which is used for detecting flaws in metal or other solid materials and more particularly to an omnidirectional ultrasonic search mechanism employing a transducer, and wherein complete directional coverage of a given area to be checked is obtained simultaneously.

The prior art devices employing transducers for detecting flaws or imperfections, did not provide complete directional coverage of the area checked, but provided coverage in one direction only. In order to cover all directions in a large area using prior art devices, a minimum number of 18 inspections, are required in order to obtain complete directional coverage, which is both costly and time consuming.

The present invention is a device which ultrasonically and nondestructively detects both internal and external defects in metal or other solid material in the shortest possible time, without regard to the direction or orientation of the defect.

An object of the present invention is the provision of a detection system for detecting major and minor flaws in metal or other solid material which are used at stress levels close to the ultimate strength.

Another object is to provide a method for nondestructively detecting imperfections in metals.

A further object is the provision of a method for detecting imperfection in very large sheet metal plates with a minimum of interruption in production flow.

Still another object is to provide a method of detecting metal imperfections using a single transducer arrangement.

A final object is the provision of a method of detecting imperfections in metal, wherein the device will provide approximately one hundred percent directional coverage of the area being checked.

Other objects and advantages of the invention will hereinafter become more fully apparent from the following description of the annexed drawings, which illustrate a preferred embodiment and wherein.

The invention entails directing a beam or spot of acoustic energy, upon a metal object to be tested, by means of cones, wherein the energy will be returned to the transducer and registered or recorded as a trace if a flaw is detected in the metal being tested.

Figure 1:
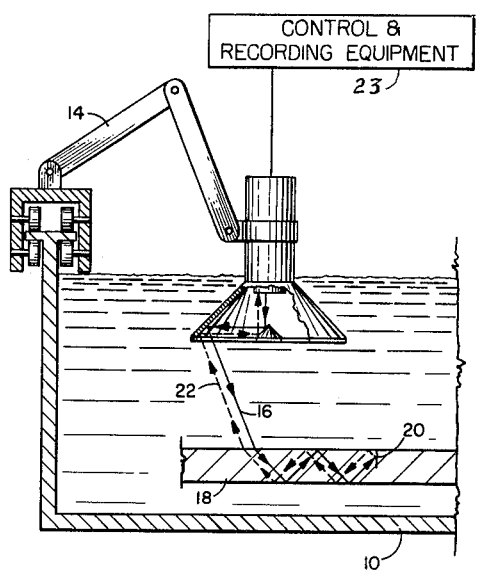
FIG. 1 is a schematic diagram showing the test apparatus in a testing environment, and illustrating the path a beam follows prior to and after a defect or flaw is detected.
Figure 2:
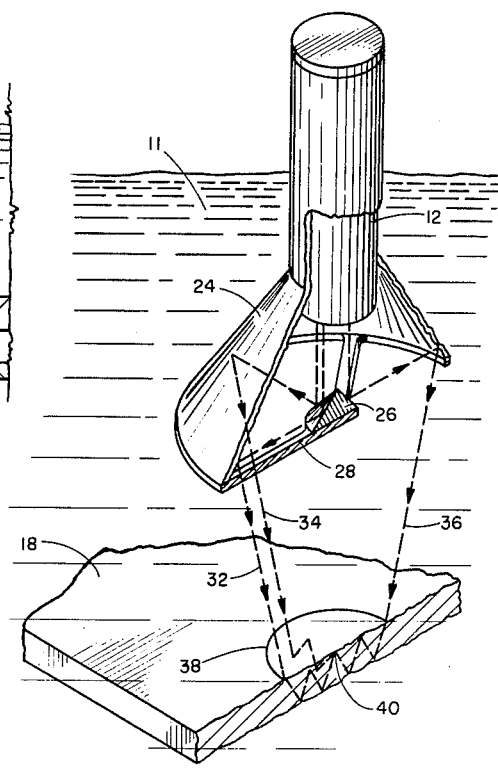
FIG. 2 is an oblique cut away view, of the detecting device, under water and depicting the travel of energy from a transducer to provide complete directional coverage.

Referring now to the drawings in detail, wherein like reference characters designate like or corresponding parts throughout the several views, there is shown in FIG. 1, a schematic of the invention including tank 10 containing a liquid such as water 11, oil, or the like serving as a medium for the transfer of acoustic energy, emitting from transducer 12, shown in FIG. 2. It can further be seen in FIG. 1, that the acoustic beam is inclined from the vertical at an angle of incidence of 20° producing a beam in a device to be tested at an angle of 45° in the case of steel. This angle is somewhat critical, with the 20° angle providing the best response in steel but an angle up to 40° or more could be used for some materials.

The device may be attached to tank 10 by any convenient means, such as a traveling arm or conventional bridge and carriage 14. A compressional wave of energy 16 is emitted from the transducer and directed to a plate of metal 18 or the like to be tested, wherein the energy creates a vibration in the plate and thus bounces between the top and bottom of the plate wherein this effect continues until all the energy is dissipated, or a defect such as that shown at 20 is encountered. The device can be varied in height over the plate so as to vary the spot size and bounce in the plate. As the distance between the plate and transducer increases, the spot size decreases as well as the bounces in the plate. From this, it can be seen that only a very small area could be tested if desired. Upon detecting or encountering a defect, a significant portion or all of the wave is reflected back along approximately the same path as the emitted wave, as represented by the broken line 22, to the transducer which may act as both a transmitter and receiver. This returned signal can now be detected by conventional means such as a cathode ray tube arrangement, or graph readout mechanism etc. as illustrated at 23, wherein the signal returned will appear as an abnormal or distorted signal, thus indicating the possibility of a crack or other defect being present in plate 18.

Figure 3:
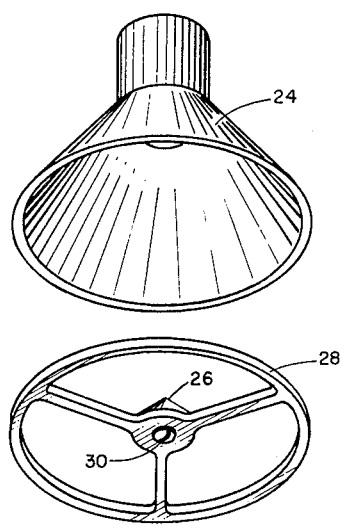
FIG. 3 illustrates the disassembled portions of an upper and lower cone section of the present invention.

Referring to FIG. 2, there is shown transducer 12 enclosed in an outer cone 24, with said cone having a second center cone 26, attached to the outer cone, and located directly below the center of the transducer 12, both cones being concentric and coaxial with the transducer 12. The center cone 26 can be attached to cone 24 by any convenient manner such as by wires, or by a spoked arrangement 28 more specifically shown in FIG. 3. Further, center cone 26 may be attached to spoke 28 by screw means 30 or may be welded or attached in any convenient manner or means.

As shown in FIG. 2 transducer 12 emits a wave of energy of which beams 32, 34, 36, are wholly a representation thereof since it is understood that beams or rays of energy are being emitted over a 360° circle from the transducer downwardly to inner cone 26 wherein the direction is changed 90° or perpendicular to the downwardly emitted rays. The rays are now directed toward the outer cone 24 which is made of such a high sound velocity that the angles of incidence used are above critical for both longitudinal and shear waves wherein upon striking the outer cone, the rays are redirected downwardly at an angle governed by the apex angle of the outer cone, with said angle being chosen to give the desired angle of incidence to the beams on the object being tested. As the angled rays strike the object tested, a circle of entry energy 38 is produced at which a shear wave is generated in the plate 18 and therein proceeds over the paths shown, to the point of convergence 40. It is understood, that any flaw within the circle of entry will cause reflections and therefor indicate a flaw since the beam will travel back along the same path it originated from upon striking a flaw. The best or ultimate area of indication of a flaw, would be at the point of convergence 40. Thus, if a flaw is detected, the exact point of the flaw can be found by moving the detector around until the point of convergence is at the flaw.

Figure 4:
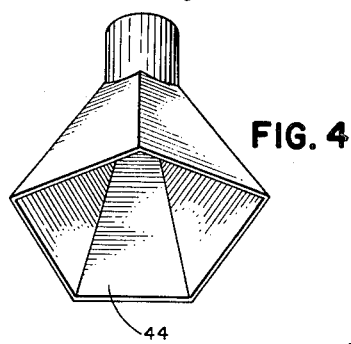
FIG. 4 illustrates a modification of the upper cone section of the present invention.

If it be desired to eliminate the possibility of oppositely directed beams following each others paths back to the transducer which would erroneously indicate a flaw, sound absorbers may be placed at evenly spaced intervals around the inside of the outer cone so as to eliminate the oppositely directed beams without eliminating the desired full coverage, since exact perpendicularity of beam to defect is not required in order to detect flaws. A further way to eliminate undesired flaws, would be to provide apertures in the outer cone so that beam 32 for instance, would pass therethrough, while beam 36 opposite 32 would not, etc. The object being to eliminate opposite beams. Another possible method of eliminating erroneous flaw indications, would be to construct either the inner or outer cone as a polyfaced pyramid, having an odd number of faces 44, as shown in FIG. 4, or have both with an odd number of faces.

A further modification of the device would be to eliminate transducer 12 and replace cone 26 with a cylindrical omnidirectional transducer, or provide several transducers arranged in a circle in place of the cone. In this way, the transducers would transmit rays directly to the outer cone.

In summary, it has been found that by using only the transducer, defects in metals or other solids can be found in one scan of an area of the material tested regardless of defect orientation. Since the time for inspection is now reduced from approximately 18 scans per inspection, as in the prior art, to one scan per inspection, only five percent of the former time is required per inspection, resulting in a saving of a great deal of time and money.

Obviously many modifications and variations of the present invention are possible in the light of the above teachings. It is therefore to be understood that within the scope of the appended claims the invention may be practiced otherwise than as specifically described.

What is claimed is:
1. An omnidirectional ultrasonic search system for detecting a flaw in a material, which comprises:
   a transducer for generating axially aligned acoustical rays of energy which are directed onto a material to be tested for a flaw and receiving acoustical rays of energy reflected back by a flaw within the material to be tested,
   a polyfaced structure secured relative to said transducer coaxial therewith, said polyfaced structure having an odd number of sloping faces forming a small open end and a larger open end with the faces sloping toward the axis at the small end,
   said polyfaced structure being secured relative to said transducer with the small end thereof at the output-receiving end of said transducer in axial alignment therewith,
   a small cone-shaped body secured within said polyfaced structure on the axis thereof with the base thereof in the same plane as the base of said polyfaced structure and the vertex end directed toward said transducer,
   said cone-shaped body operative to reflect incident acoustical rays from said transducer onto said polyfaced structure and to reflect rays returned from said polyfaced structure onto said transducer,
   said polyfaced structure having sloping inner wall surfaces to focus incident acoustical rays onto a test material on a line along the axis of said transducer wherein a flaw in the test material reflects the acoustical rays back to said transducer via said polyfaced structure and to said cone within said polyfaced structure, and
   an indicator means for recording a signal produced by said transducer due to the acoustical rays returned to said transducer whereby the recorded signal represents a flaw in the test material.
2. A search system as claimed in claim 1, wherein:
   the inner face of said polyfaced structure has a slope which reflects incident rays toward the test material at an angle of from about 20 degrees to about 40 degrees relative to a vertical line through the point of incidence.

References Cited by the Examiner
UNITED STATES PATENTS

| | | | |
|---|---|---|---|
| 2,527,986 | 10/1950 | Carlin | 73—67.8 |
| 3,028,752 | 4/1962 | Bacon | 73—67.8 |
| 3,101,608 | 8/1963 | Benson et al. | 73—67.5 |
| 3,121,324 | 2/1964 | Cowan | 73—67.5 |
| 3,168,659 | 2/1965 | Bayre et al. | 73—67.5 |
| 3,192,418 | 6/1965 | Sansom | 73—67.8 |

RICHARD C. QUEISSER, *Primary Examiner.*

L. R. FRANKLIN, *Assistant Examiner.*